United States Patent
Xue et al.

(10) Patent No.: US 8,403,711 B2
(45) Date of Patent: Mar. 26, 2013

(54) BACKGROUND OF THE INVENTION

(75) Inventors: Zhang-Lan Xue, Kunshan (CN);
Hong-Qiang Han, Kunshan (CN);
Zi-Qiang Zhu, Kunshan (CN)

(73) Assignee: Hon Hai Precision Ind. Co., Ltd., New Taipei (TW)

( * ) Notice: Subject to any disclaimer, the term of this patent is extended or adjusted under 35 U.S.C. 154(b) by 20 days.

(21) Appl. No.: 13/221,805

(22) Filed: Aug. 30, 2011

(65) Prior Publication Data

US 2012/0052719 A1   Mar. 1, 2012

(30) Foreign Application Priority Data

Sep. 1, 2010   (CN) .......................... 2010 2 0513080

(51) Int. Cl.
*H01R 9/22* (2006.01)
(52) U.S. Cl. ........................................... 439/709
(58) Field of Classification Search .................. 439/709, 439/76.1
See application file for complete search history.

(56) References Cited

U.S. PATENT DOCUMENTS

| | | | |
|---|---|---|---|
| 4,460,232 A * | 7/1984 | Sotolongo | 439/535 |
| 7,591,690 B1 * | 9/2009 | Chien et al. | 439/709 |
| 7,737,355 B2 * | 6/2010 | Nieleck et al. | 136/243 |
| 8,007,306 B2 * | 8/2011 | Nightingale et al. | 439/366 |
| 8,083,540 B1 * | 12/2011 | Spicer et al. | 439/460 |
| 8,222,533 B2 * | 7/2012 | Gherardini et al. | 174/260 |
| 8,227,942 B2 * | 7/2012 | Marroquin et al. | 307/147 |
| 2009/0084570 A1 | 4/2009 | Gherardini et al. | |
| 2012/0077392 A1 * | 3/2012 | Thompson et al. | 439/889 |

* cited by examiner

*Primary Examiner* — Phuong Dinh
(74) *Attorney, Agent, or Firm* — Wei Te Chung; Ming Chieh Chang

(57) ABSTRACT

A PV (photovoltaic) junction box comprises a case, a lid covering the case and a plurality of terminals received within the case. The case has a bottom wall and defines a positive input port and a negative output port, and each terminal having a planar main body retained to the main body. The terminals comprise a first terminal, a second terminal, a third terminal and a fourth terminal, and the main bodies of the terminals are different.

15 Claims, 6 Drawing Sheets

BACKGROUND OF THE INVENTION

BACKGROUND OF THE INVENTION

1. Field of the Invention

The invention relates to a junction box, especially for a PV (photovoltaic) junction box for connecting to a solar panel.

2. Description of Related Art

Junction boxes are used in a wide variety of technical sectors in order to make electrical connections between electric lines and an electrical device. Solar panels have a large number of solar cells which are used to convert power from sunlight. The power generated by the solar cells is conveyed via electric lines, for example to a rectifier, for feeding into an alternating current (AC) network or to a battery. A PV junction box is generally provided for electrical connection to the lines of the solar panel.

A conventional junction box is known from US patent application No. 2009/0084570A1, issued on Apr. 2, 2009. The junction box has a case and terminals mounted to the case, the case define a positive input port and a negative output port, and the terminals have a first dispersing pad disposed near the positive input port and used for positive electrode, a second dispersing pad disposed near the negative output port and used for negative electrode, and a third dispersing pad disposed between the first and the second dispersing pads. All of above dispersing pads have a same area, however, usually a positive electrode occurs much more heats relative to a negative electrode with same area, so the first dispersing pad may accumulate heats within the junction box that may influence a lift of the junction box.

Hence, an improved PV junction box is highly desired to overcome the aforementioned disadvantages of the prior art.

SUMMARY OF THE INVENTION

Accordingly, an object of the present invention is to provide an PV junction box which can disperse heats efficiently.

To fulfill the above object, a PV junction box comprises a case, a lid covering the case and a plurality terminals, the case has a bottom wall and a plurality of sidewalls located on a peripheral of the bottom wall and defines a receiving cavity cooperatively with the bottom wall, the case defines a positive input port and a negative output port. Each terminal has a planar main body mounted to the bottom wall of the case, the terminals comprises a first terminal near the positive input port and a fourth terminal near the negative output port, respectively, the main body of the first terminal has a larger area than that of the main body of the fourth terminal.

Other objects, advantages and novel features of the present invention will be drawn from the following detailed description of a preferred embodiment of the present invention with attached drawings.

DETAILED DESCRIPTION OF THE INVENTION

Reference will now be made in detail to the preferred embodiment of the present invention.

Figure 1:
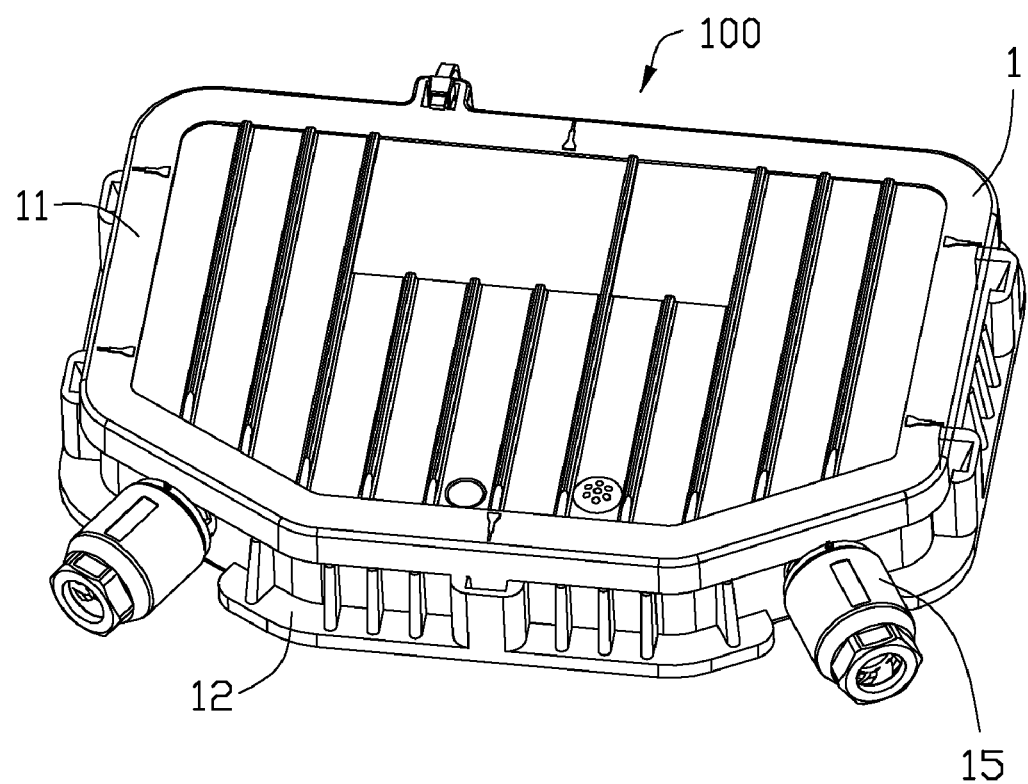
FIG. 1 is an assembled, perspective view of a PV junction box in accordance with a preferred embodiment of present invention.
Figure 2:
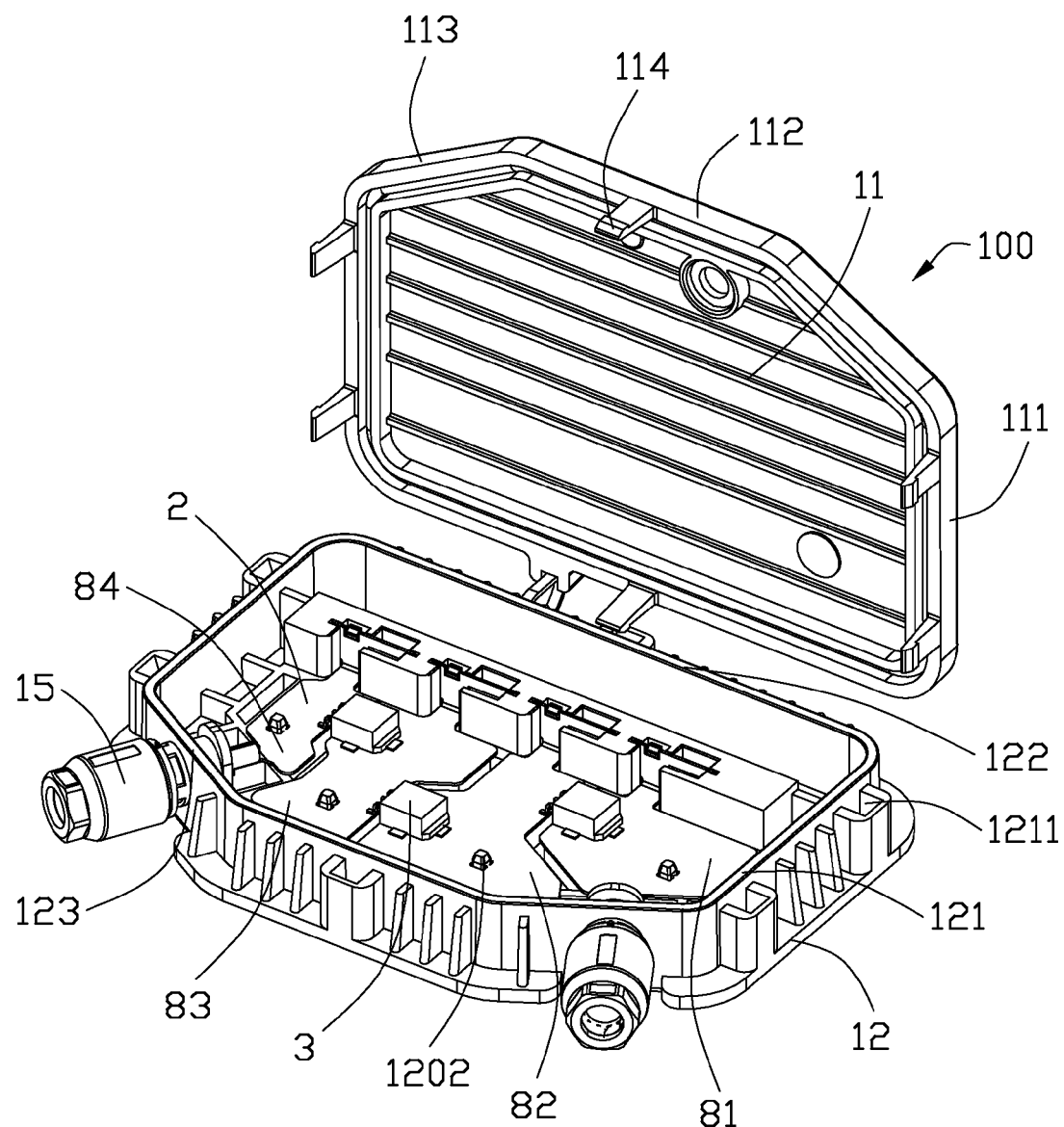
FIG. 2 is another assembled, perspective view of the PV junction box, wherein the lid of the junction box is opened.

Referring to FIG. 1 and FIG. 2, a PV junction box 100 in accordance with a preferred embodiment of present invention is adapted to connect solar panels and transmit currents. The PV junction box 100 electrically connects with two cables (not shown) and comprises an insulative housing 1, a plurality of terminals 2 secured within the insulative housing 1 to connect the two cables and a plurality of diodes 3.

Figure 4:
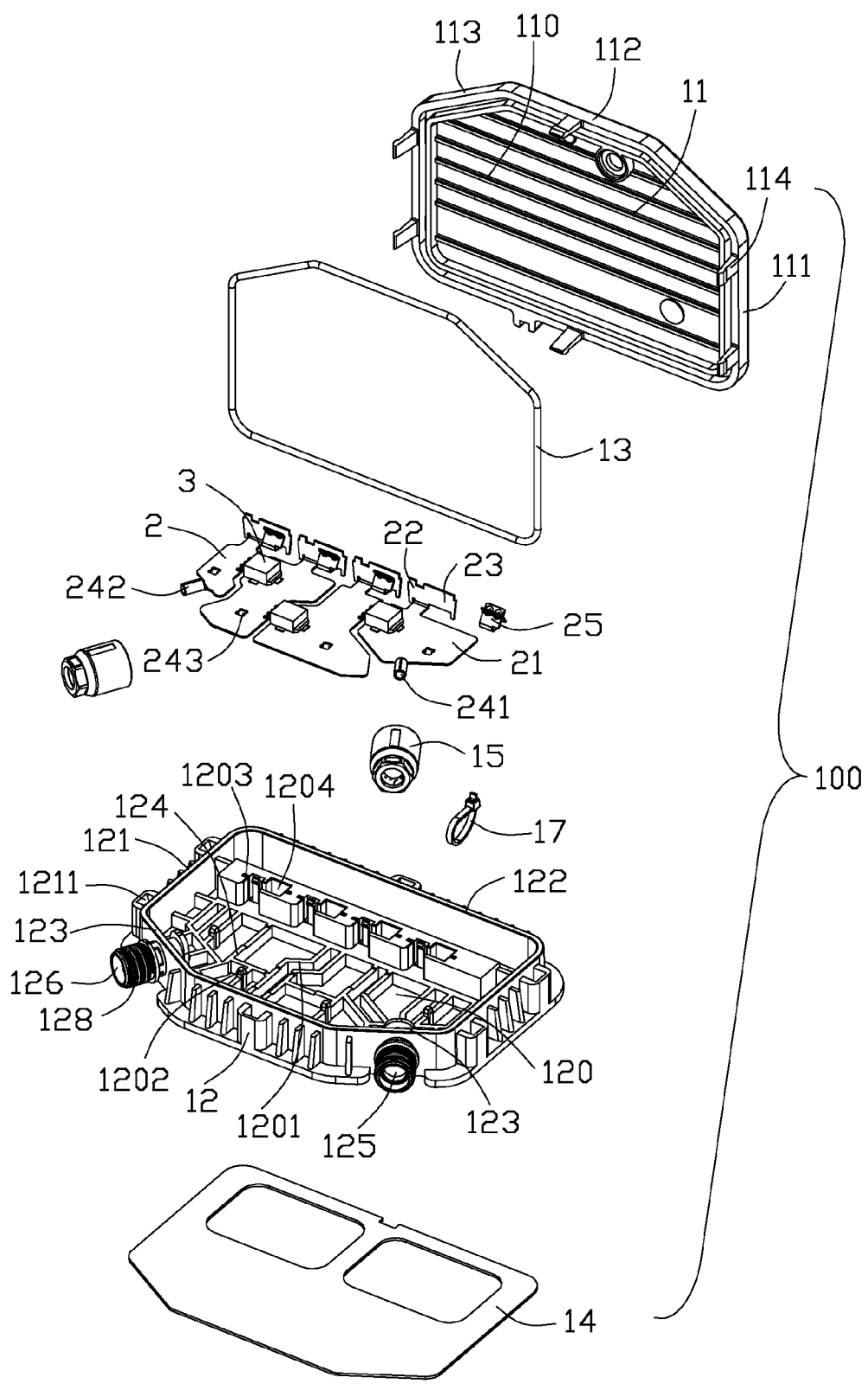
FIG. 4 is an exploded view of the PV junction box.
Figure 5:
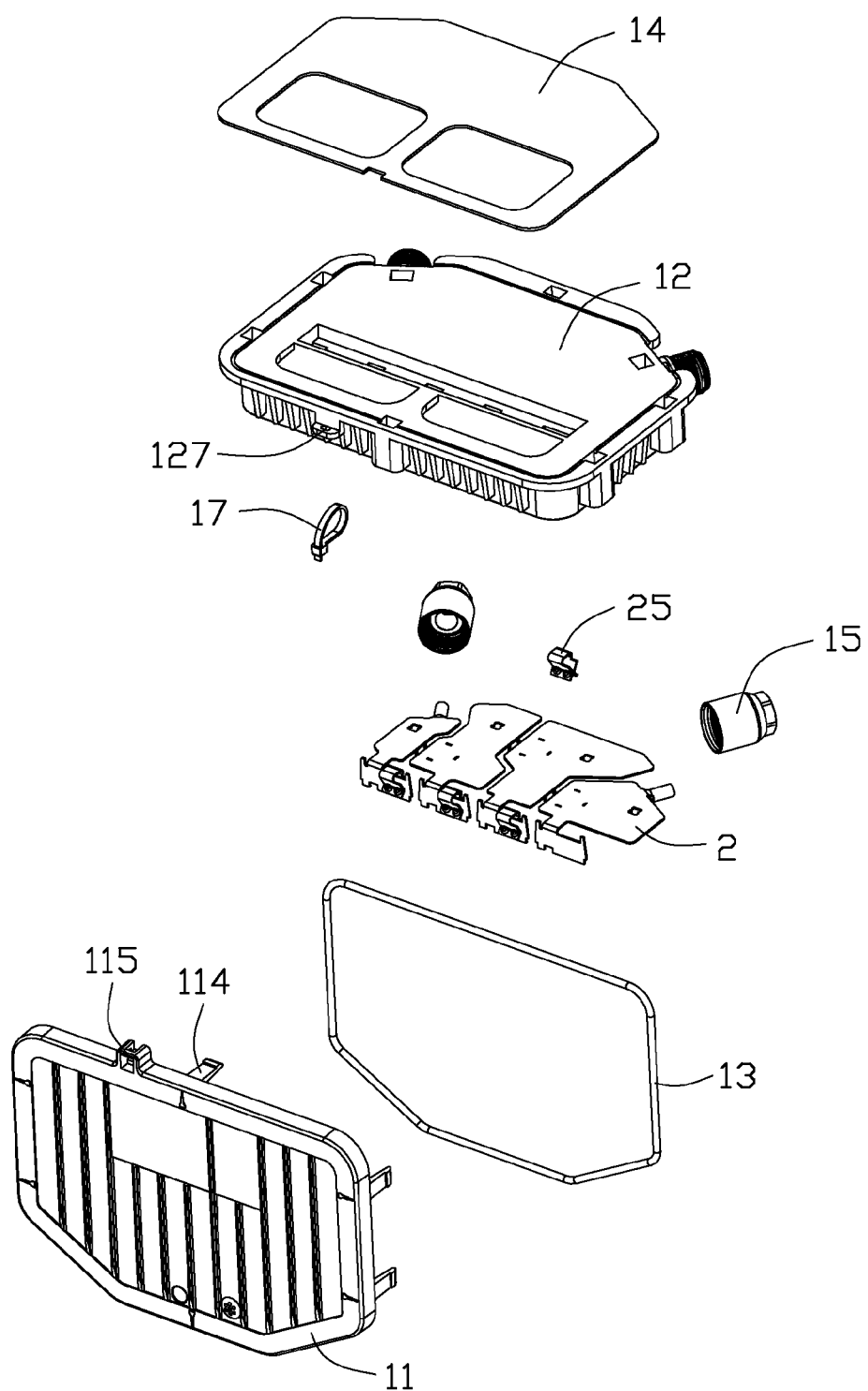
FIG. 5 is similar with FIG. 4, but taken from another side.

Referring to FIG. 4 and FIG. 5, the insulative housing 1 has a substantial square box shape, and comprises a case 12 and a lid 11 covering the case 12 and a sealing ring 13, an adhesive film 14 mounted to a bottom surface of the case 12 and a tying rope 17 tying the lid 11 and the case 12. The sealing ring 13 substantially is made of silicone or plastic material and sandwiched between the lid 11 and the case 12 to provide a well waterproof function of the PV junction box 100. The adhesive film 14 is used to adhere to the solar panel.

The lid 11 has a top wall 110 and a plurality of side walls extending downwardly from a peripheral of the top wall 110. The side walls include a pair of first outer walls 111 parallel to each other and extending along a front-to-back direction, a pair of second outer walls 112 parallel to each other and extending along a right-to-left direction and two inclined walls 113 provided between one of the second outer walls 112 located in the front of the lid 11 and each of the two first outer walls 111, respectively. The two inclined walls 113 are symmetrical disposed along a transverse or longitude axis of the lid 11. The first and the second outer wall 111, 112 are further formed with a plurality of latching arms 114 downwardly and uprightly extending to latch with the case 12. The second outer wall 112 in the back of the PV junction box 100 is provided with a first hole 115 for the tying rope 17 passing through.

Figure 3:
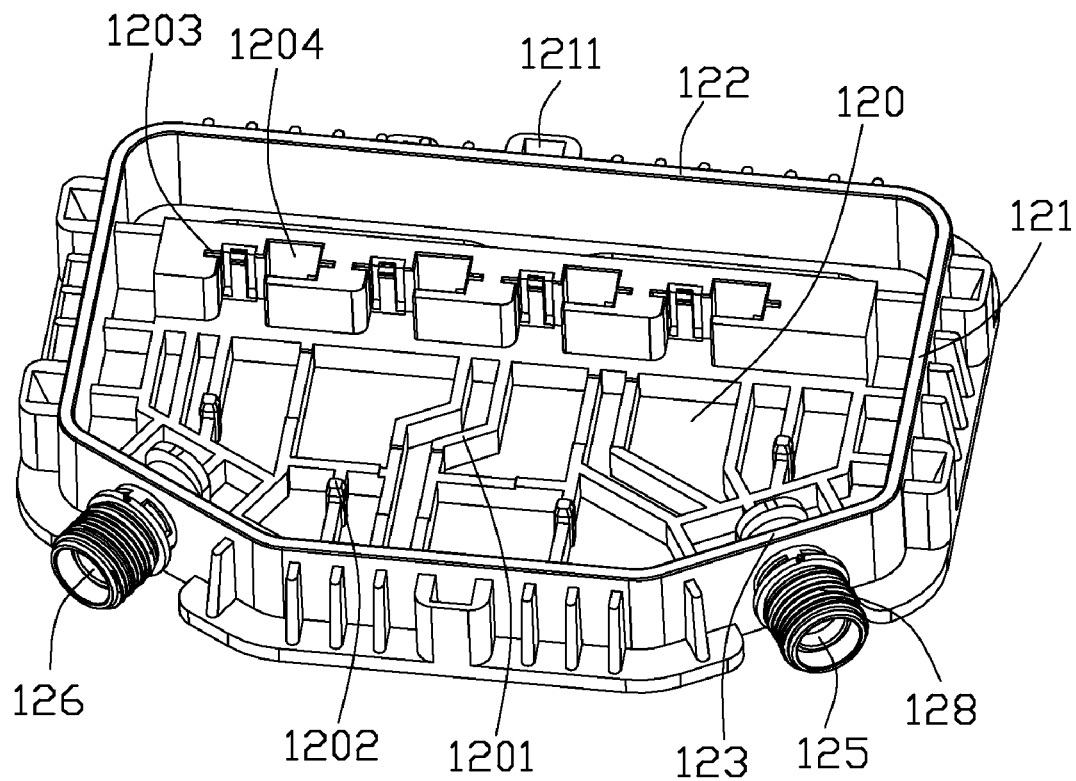
FIG. 3 is another perspective view of the PV junction box without the lid.

Referring to FIGS. 3-4, the case 12 has a corresponding configuration to that of the lid 11, and comprises a bottom wall 120 and a plurality of sidewalls extending upwardly from a peripheral of the bottom wall 120. The sidewalls include a pair of first sidewalls 121 parallel to each other and extending along the front-to-back direction, a pair of second sidewalls 122 parallel to each other and extending along the right-to-left direction and two inclined connecting sidewalls 123 provided between one of the second sidewall 122 located in the front of the case 12 and each of the two first sidewalls 121, respectively. The two connecting sidewalls 123 are symmetrical disposed, and the position and configuration of the inclined connecting sidewalls 123 are corresponding to that of the inclined wall 113 of the lid 11. The first sidewalls 121, the second sidewalls 122, the connecting sidewalls 123 and the bottom wall 120 cooperatively define a receiving cavity 124 for receiving the terminals 2.

Conjoined with FIG. 2, the bottom wall 120 has a plurality of ribs 1201 for supporting the terminal 2 and a plurality of positioning posts 1202 further upwardly extending to position the terminal 2. The bottom wall 120 defines a plurality of retaining slots 1203 for retaining with the terminal 2 and a plurality of receiving slots 1204 communicating with the latching slot 1203 for receiving clampers 25 at a rear end thereof. The first sidewalls 121 and the second sidewalls 122 of the case 12 are formed with a plurality of latching grooves 1211 for latching with the latching arms 114 of the lid 11. One of the second sidewall 122 located on the rear of the case 12 defines a second hole 127. The tying rope 17 passes through the first hole 115 of the lid 11 and the second hole 127 of the case 12 to tie the lid 11 and the case 12.

A riveting portion 128 protrudes outwardly from the connecting sidewall 123, the cable passes the riveting portion 128 into the receiving cavity 124, one of the riveting portions 128 forms a positive input port 125 on the right, and the other forms a negative output port 126 on the left. The riveting portion 128 is vertical to the connecting sidewall 123 and engages with each other in a face-to-face manner, no gap will appear between the riveting portion 128 and the connecting sidewall 123, so that the PV junction box 100 is well sealed and has a satisfied waterproof property. The riveting portion 128 is integrally formed with the case 12 in present embodiment, but also can de discrete with the case 12 in other embodiment. The riveting portion 128 defines a 45 degrees angle to a transverse axis or a longitudinal axis of the case 12, but the angle can be various within 0-90 degrees in other embodiment and decided by a position of adjacent junction box.

The PV junction box 100 has sleeves 15 assembled to the riveting portions 128, the riveting portion 128 defines outer thread, and the sleeve 15 defines inner thread to engage with the outer thread of the riveting portion 128.

Figure 6:
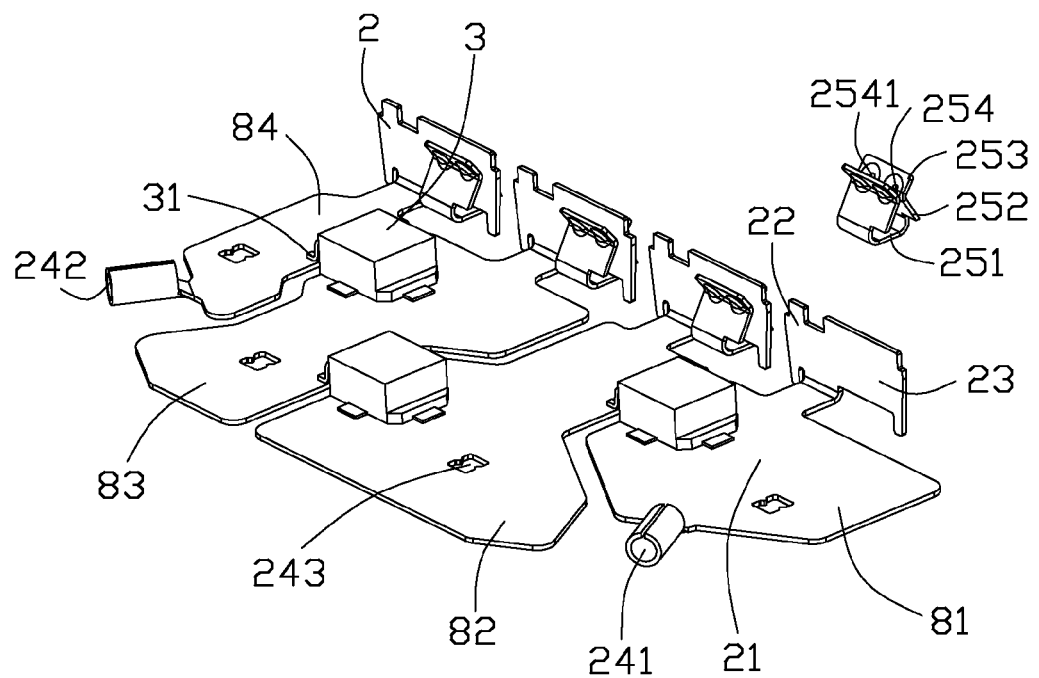
FIG. 6 is an exploded view of terminals with diodes and clampers of the PV junction box.

Referring to FIGS. 4-6, the terminal 2 is mounted in the case 12 and comprises a first terminal 81, a second terminal 82, a third terminal 83 and the fourth terminal 84 in turn along the right-to-left direction. Each of the terminals 81, 82, 83, 84 has a planar main body 21, a bending portion 22 bent upwardly from a rear end of the main body 21 and having a mounting portion 23 for connecting to a conductive foil (not shown) of the solar panel.

The bending portion 22 is planar upright piece substantially in a rectangular shape and extends along a right-to-left direction, and the mounting portion 23 is a right part of the bending portion 22 and disconnects with the main body 21. The main body 21 defines a plurality of positing holes 243 passing through the main body 21 in an upper-to-bottom direction, and the positioning posts 1202 of the case 12 insert into the positioning holes 243 to retain the terminals 81, 82, 83, 84. The diode 3 are disposed between two adjacent main bodies 21 and has legs 31 extending horizontally thereof to be soldered to the main bodies 21. Two banding portions 241, 242 extend forwardly from front edges of the main bodies 21 of the first and the fourth terminals 81, 84 to retain wires of the cables.

Usually, the first and the second terminals 81, 82 on the right near the positive input port 125 bring much more heats rather than the third and the fourth terminals 83, 24 near the negative output port 126, so total area of the first and the second terminals 81, 82 is bigger than that of the third and the fourth terminals 83, 84 in present embodiment. The first terminal 81 and the fourth terminal 84 are near outside so can radiate heats efficiently, the second terminal 82 and the third terminals 83 are located between the first and the fourth terminals 81, 84 and can not radiate heats efficiently, and the second terminal 82 is near the positive input port 125 thereby easily gathering heats.

The main bodies 21 of the terminals 2 are designed with different areas so as to disperse heats efficiently, exactly say, the main body 21 of the second terminal 82 is designed to be largest; the main body 21 of the third terminal 83 is near the negative output port 126, so the main body 21 of the third terminal 83 is designed to be larger which is smaller than the main body 21 of the second terminal 82 but larger than the main bodies 21 of the first and the fourth terminals 81, 84; the main body 21 of the third terminal 83 is small for it is near the outside; and the main body 21 of the fourth terminal 84 is smallest for it is both near the outside and the negative output port 126. That means a sequence of the terminals 2 based on the area of the main body 21 and arrayed from largest to smallest is: the second terminal 82, the third terminal 83, the first terminal 81 and the fourth terminal 84. And since the bending portions 22 of the terminals 2 substantially have an equal area, so in other words, a sequence of the terminals 2 based on the area thereof and arrayed from largest to smallest also is: the second terminal 82, the third terminal 83, the first terminal 81 and the fourth terminal 84. By above arrangement, heats produced in the PV junction box 100 can be dispersed efficiently so as to improve a using life of the PV junction box 100.

The clamper 25 has a horizontal planar base 251, two elastic arms 252 bent upwardly from a front and a rear edge of the planar base 251 and extending inwardly toward each other, two free ends 253 bent outwardly to leave each other and two clamping portions 254 connecting the free ends 253 and the elastic arms 252. The mounting portion 23 of each terminal 2 is clamped by the two clamping portions 254. So that when the PV junction box 100 electrically connects to a conductive foil of the solar panel, the conductive foil is inserted between and clamped by the clamping portion 254 and the mounting portion 23 to electrically connect with the mounting portion 23 of each terminal 2.

In present embodiment, the clamping portion 24 has a plurality of depresses 2541 in an inner surface thereof and arrayed in the right-to-left direction, so that the clamping portion 24 can connect to the mounting portion 23 from line contacting manner to multi-point contacting manner to ensure the conductive foil (not shown) reliably contacts with the mounting portion 23.

When assembly, the terminals 2 with diodes 3 and clamper 25 are retained to the bottom wall 120 of the case 12, the lid 11 are tied to the case 12 by the tying rope 17 and then covers the case 12 from a top side, with the latching arms 114 locking with the latching grooves 1211 of the case 11 and the sealing ring 13 sandwiched between the lid 11 and the case 12. The adhesive film 14 is mounted to the bottom of the case 12, and the sleeve 15 is assembled to the riveting portion 128.

While a preferred embodiment in accordance with the present invention has been shown and described, equivalent modifications and changes known to persons skilled in the art according to the spirit of the present invention are considered within the scope of the present invention as described in the appended claims.

What is claimed is:

1. A PV (photovoltaic) junction box comprising:
a case having a bottom wall and a plurality of sidewalls located on a peripheral of the bottom wall and defining a receiving cavity cooperatively with the bottom wall, the case defining a positive input port and a negative output port;
a lid covering the case; and
a plurality terminals, each terminal having a planar main body mounted to the bottom wall of the case, the terminals comprising a first terminal near the positive input port and a second terminal near the negative output port, respectively, the main body of the first terminal having a larger area than that of the main body of the second terminal, wherein the terminals further comprise a third terminal disposed between the first and the second terminals and near the positive input port, the main body of the third terminal is larger than the main body of the first terminal.

2. The PV junction box as claimed in claim 1, wherein the terminals further comprise a fourth terminal disposed between the third terminal and the second terminal and near the negative output port.

3. The PV junction box as claimed in claim 2, wherein the main body of the fourth terminal is smaller than that of the third terminal but larger than the main bodies of the first and the second terminals.

4. The PV junction box as claimed in claim 2, wherein a sequence of the terminals based on areas of the main bodies thereof and arrayed from largest to smallest is: the third terminal, the fourth terminal, the first terminal and the second terminal.

5. The PV junction box as claimed in claim 4, wherein the lid has a top wall and a plurality of side walls extending downwardly from a peripheral of the top wall, the side walls are formed with a plurality of latching arms to lock with a plurality of latching holes provide on the sidewalls of the case.

6. The PV junction box as claimed in claim 2, wherein two banding portions extend forwardly from front edges of the main bodies of the first and the second terminals to retain wires of two cables inserting into the receiving cavity from the positive input port and the negative output port, respectively.

7. The PV junction box as claimed in claim 2, wherein the terminal has a bending portion bent upwardly from a rear edge of the main body and a clamper is attached to the bending portion.

8. A PV (photovoltaic) junction box comprising:
a case having a bottom wall and a plurality of sidewalls extending upwardly from a peripheral of the bottom wall and defining a receiving cavity cooperatively with the bottom wall; and
a plurality terminals received in the receiving cavity, each terminal having a main body retained to the bottom wall and a bending portion bent vertically from the main body, the terminals comprising a first terminal, a second terminal and a third terminal disposed between the first and the second terminals, the third terminal being larger than the first and the second terminal, wherein the terminals further comprise a fourth terminal disposed between the third and the second terminals, and the fourth terminal is smaller than the third terminal, wherein the fourth terminal is larger than the first terminal, and the second terminal is the smaller than the first terminal, wherein the main body of the first terminal is larger than the main body of the second terminal but smaller than the main body of the fourth terminal, and the main body of the third terminal is the largest.

9. The PV junction box as claimed in claim 8, wherein the side walls include a pair of first sidewalls parallel to each other and extending along a front-to-back direction, a pair of second sidewalls parallel to each other and extending along a right-to-left direction and two inclined connecting sidewalls connects one of the second sidewall located in the front of the case and the two first sidewalls, respectively; and the case has a riveting portion vertically and outwardly protruding from the connecting sidewall.

10. The PV junction box as claimed in claim 8, wherein the main body of the terminal has a through positioning hole, and the bottom wall of the case is provided with a post inserting into the positioning hole to retain the terminal.

11. The PV junction box as claimed in claim 8, further comprising a lid, the lid defines a first hole at a rear end thereof, and the case defines a corresponding second hole outside the receiving cavity, a tying rope passes through the first and the second holes to tie the lid and the case together.

12. A PV junction box comprising:
a casing defining a long lengthwise direction and a transverse direction with two chamfered structure around two opposite corners on one lengthwise side in the lengthwise direction;
a receiving cavity formed in the casing;
a positive port and a native port located around the corresponding chamfered structure; and
a plurality of terminals commonly arranged in the cavity along the lengthwise direction and including two opposite outer terminals and the remaining inner terminals in the lengthwise direction;
a plurality of diodes connecting between every two adjacent two terminals, respectively;
said two opposite outer terminals being shorter than the remaining inner terminals in the lengthwise direction;
each of said terminals being arranged with expanded and narrowed sections along the transverse direction under condition that every adjacent two terminals are complementarily and alternately arranged with each other in the transverse direction, wherein said casing further defines another lengthwise side extending in the lengthwise direction and arranged opposite to said lengthwise side in the transverse direction, under condition that each of the terminals occupies a substantial portion of the whole dimension of said another lengthwise side in the lengthwise direction while only the inner terminals make contribution to occupy a substantial portion of the dimension of said lengthwise side between the chamfered structure in the lengthwise direction.

13. The PV junction box as claimed in claim 12, wherein the diodes are arranged offset from one another in both the lengthwise direction and the transverse direction.

14. The PV junction box as claimed in claim 12, wherein one of the opposite outer terminals is a positive terminal and the other is a negative terminal under condition that positive terminal is larger than the negative terminal.

15. The PV junction box as claimed in claim 14, wherein there are two said inner terminals under condition that one of said two inner terminals closer to the positive terminal is larger than the other of said two inner terminal while both of said two inner terminals are larger than the positive terminal.

* * * * *